Nov. 7, 1950 E. E. MASTERSON 2,528,699

INVISIBLE SOUND RECORD EDITOR

Filed Feb. 18, 1948

INVENTOR
Earl E. Masterson

BY
Orl R. Goshaw
ATTORNEY

Patented Nov. 7, 1950

2,528,699

UNITED STATES PATENT OFFICE 2,528,699

INVISIBLE SOUND RECORD EDITOR

Earl E. Masterson, Palmyra, N. J., assignor to Radio Corporation of America, a corporation of Delaware Application February 18, 1948, Serial No. 9,300

7 Claims. (Cl. 179—100.1)

This invention relates to motion picture sound film apparatus, and particularly to a sound scanning or editing device for magnetic or other forms of invisible sound records or tracks.

In the art of motion picture production, it is well-known that various types of photographic film cutting and editing devices are employed, some of which consist simply of a source of light, an optical arrangement for projecting a narrow beam of light on the sound track area, a photocell, an amplifier, and a loud speaker. Other editors are more elaborate, in which a picture portion of the film or the concomitant picture on a second film are simultaneously projected during the reproduction of the sound track. In most prior devices, the sound record is advanced past a stationary light beam. Other forms of editors have been suggested, however, such as the type disclosed and claimed in Sharp copending U. S. application, Ser. No. 725,341, filed January 30, 1947, now Patent No. 2,510,607, granted June 6, 1950, in which the film is held stationary and either a scanning beam is intermittently passed over the sound track, or a strip of film is continuously illuminated and a pickup cell is intermittently passed over the illuminated area.

One of the reasons a sound picture film is edited is to synchronize various sequences with the picture and/or to locate imperfections in the sound track, which may be of various types, such as poor modulations, scratches, extraneous matter, and the like. In photographic sound tracks, after a certain improper sound is heard, the track may be examined visually, and the point of trouble thus easily located. With the advent of magnetic sound recording, however, wherein the magnetic record is not visible, difficulty arises in accurately locating any particular point on the record. The present invention, therefore, is directed to a magnetic or other invisible sound track editor which overcomes this difficulty not only by making visible the actual sound track being reproduced, but also by superimposing the visual track upon the film in registry, so that the actual point being sought may be accurately located. Magnetic scanning systems are known, wherein the track being reproduced is made visible in some form, reference being made to Stille U. S. Patent No. 1,116,949 of November 10, 1914, and to later patents, such as Potter U. S. Patent No. 2,425,003 of August 5, 1947. It appears, however, that none of these prior suggestions permits the editing of a magnetic film or tape sound track by the accurate superimposing of the visible record upon the actual invisible record being reproduced.

The principal object of the invention, therefore, is to facilitate the reproduction and editing of an invisible sound record.

Another object of the invention is to provide an improved magnetic sound reproducing system for editing the sound record.

A further object of the invention is to provide an improved method of and system for accurately locating a certain point on an invisible sound record, such as a magnetic sound record.

A still further object of the invention is to provide an improved magnetic sound track editor.

Although the novel features which are believed to be characteristic of this invention will be pointed out with particularity in the appended claims, the manner of its organization and the mode of its operation will be better understood by referring to the following description read in conjunction with the accompanying drawings, forming a part hereof, in which:

Figure 1:
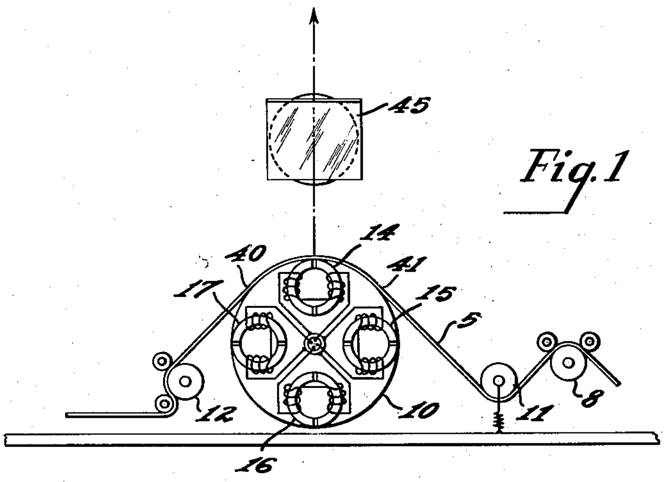
Fig. 1 is a diagrammatic, elevational view illustrating the operation of the invention.
Figure 2:
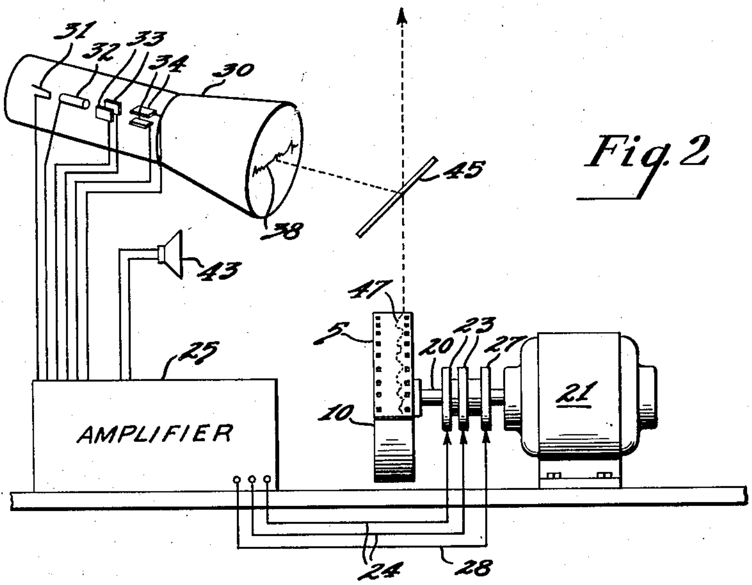
Fig. 2 is a combination diagrammatic and perspective view embodying the invention.
Figure 3:
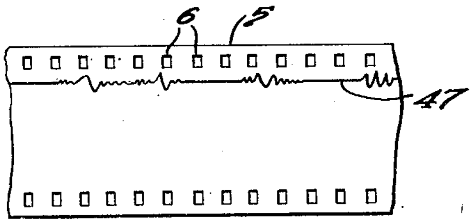
Fig. 3 is a section of the film illustrating the operation of the invention.

Referring now to the drawings, in which the same numerals identify like elements, a sound record strip 5 may be of the film type having perforations as shown at 6, may be of the tape type without perforations, or may be of any other well-known magnetic recording medium, although a medium of the flat tape type is preferable. The sound record film is adapted to be driven by a sprocket or roller 8 over a magnetic head wheel 10, a tensioned idler roller 11 being provided to obtain the desired film motion. A hold-back roller 12 is provided on the other side of the magnetic head wheel 10.

The head wheel is shown as consisting of four magnetic reproducing heads 14, 15, 16, and 17, although a different number of heads could be used. The heads are mounted for rotation on a shaft 20 driven by a motor 21, the output leads from the pickup heads being terminated in slip rings 23 having contactors which feed the output of the heads to conductors 24 connected to an amplifier 25. A third ring 27 is connected with the amplifier 25 over conductor 28 and is used for triggering the horizontal sweep of a cathode ray tube 30 so that the scanning beam thereof starts and moves in unison with the magnetic head gap. A usual cathode 31, accelerating anode 32, and deflection plates 33 and 34 of tube 30, are shown connected to the output of amplifier 25 for producing a motion of the cathode ray beam corresponding to the variations in magnetism in the sound track of the film 5, this motion being observable as a trace, as shown at 38.

Thus, with the film 5 stationary and the motor 21 energized, the sound heads will be rotated so that the portion of the film lying between points 40 and 41 will be reproduced intermittently, and the trace thereof will be shown at 38. The sound may also be made audible over a loud speaker 43 connected to amplifier 25. To accurately locate the sound track with respect to the portion of the film being reproduced, a semi-transparent mirror 45 is mounted at 45 degrees with respect to the axis of the tube 30 so that the film may be seen directly by transmission, and the cathode ray image 38 may be seen by reflection. When the distance from the mirror 45 to the trace 38 is equal to the distance from the mirror 45 to the film, the trace will appear to be superimposed on the film as shown at 47. Although the track is shown in the drawings as a normal cathode ray trace, it could be modified to appear as a variable area track by amplitude modulation of a high frequency carrier or could be made to appear as a variable density track by modulating the intensity of the electron beam. The amplitude of the track could be increased in any amount desired.

The synchronism of the magnetic head gap and the horizontal sweep of the cathode ray tube could be checked at any time by holding a very small permanent magnet on the magnetic head wheel 10 as it revolves. If a deflection occurs which optically coincides with the actual position of the magnet, it will prove that synchronism exists. The speed of rotation of the magnetic head wheel 10 should be sufficient so that the trace does not flicker appreciably. A speed in the neighborhood of 24 scannings per second is satisfactory. Also, a cathode ray screen having long persistence is desirable.

In the normal operation of the above described system, the film to be edited would be advanced by the drive sprocket or roller 8 in the normal manner with the wheel 10 stationary. One of the heads such as 14 would then reproduce the sound record in the normal way and the output would be heard on loud speaker 43 and observed at 38. If any imperfection was heard at any time, the film could then be returned approximately to the point being sought, stopped, and the head wheel 10 rotated. If the point was not in this portion of the film, another section or sections of the film could be moved by hand over the head wheel. In this manner, the spot could be accurately located, since the visible sound track is superimposed upon the invisible record. The location of cutting points, points to be synchronized with the picture, or points of imperfections are thus easily found. Although a cathode ray tube has been disclosed as the means for producing an image of the sound track, a galvanometer modulated by the sound track currents could also be employed at this point in the system.

I claim:

1. A sound record system comprising a sound record medium having an invisible sound record thereon, means for maintaining said record stationary, a scanning system for scanning a predetermined longitudinal section of said stationary record, means for making visible said invisible sound record, and means for visibly superimposing said visible record upon said invisible record during the reproduction thereof.

2. A sound record system in accordance with claim 1, in which said invisible record is a magnetic sound record and said means for making visible said invisible record includes a cathode ray tube and a magnetic reproducing head adapted to be intermittently moved over said predetermined longitudinal section of said stationary record.

3. A sound track editor for an invisible sound track comprising a flexible medium on which said track is located, means for translating said track into electrical currents, said means including a curved structure having at least one magnetic reproducing head therein, said medium contacting a substantial portion of the surface of said structure, means for translating said electrical currents into a visible image, means for rotating said structure at a rate to provide a visible image of said sound track between the point at which said medium first makes contact with said structure and the point at which said medium leaves said structure, and means for superimposing said visible image upon the portion of said sound track medium being scanned by said head.

4. A sound track editor for an invisible sound track in accordance with claim 3, in which means are provided for reproducing a longer section of said sound track, said means including means for advancing said medium.

5. A sound track editor comprising a medium having an invisible sound track thereon, a drive means for advancing said medium, a pickup unit for translating said track into electrical currents, said unit including a curved structure, said medium contacting a substantial portion of the surface of said structure, and a magnetic reproducing head in said structure contacting said medium substantially mid-way between the point at which said medium first contacts said structure and the point at which said medium last leaves said structure, a device connected to said head for translating said currents into a visual image, and a partial light deflector for reflecting a portion of the light of said image at substantially right angles to its direction of impingement on said reflector, and reflecting the remainder of said light to said medium for viewing said image in the position of said sound track being translated, said image being in registry with said sound track when said medium is stationary.

6. A sound track editor in accordance with claim 5, in which means are provided for rotating said head and translating the portion of said sound track on said medium in contact with said structure into electrical currents when said medium is stationary.

7. A sound track editor in accordance with claim 6, in which said last mentioned means includes a plurality of spatially disposed magnetic reproducing heads around said structure.

EARL E. MASTERSON.

REFERENCES CITED

The following references are of record in the file of this patent:

UNITED STATES PATENTS

| Number | Name | Date |
|---|---|---|
| 1,899,032 | Handschiegl | Feb. 28, 1933 |
| 1,959,498 | Planskoy | May 22, 1934 |
| 2,348,050 | Barnstyn | May 2, 1944 |
| 2,352,023 | Schullter | June 20, 1944 |
| 2,424,295 | Williams | July 22, 1947 |